United States Patent [19]

Mix

[11] 4,105,723
[45] Aug. 8, 1978

[54] VAPOR-LIQUID CONTACTING

[75] Inventor: Thomas W. Mix, Wellesley, Mass.

[73] Assignee: Merix Corporation, Wellesley, Mass.

[21] Appl. No.: 689,178

[22] Filed: May 24, 1976

[51] Int. Cl.² .................. B01J 10/00; B01D 3/22
[52] U.S. Cl. ..................... 261/105; 55/259; 261/109; 261/110; 261/114 R
[58] Field of Search .............. 261/114 R, 94, 105, 261/109, 110; 202/158, 197; 55/259

[56] References Cited

U.S. PATENT DOCUMENTS

| | | | |
|---|---|---|---|
| 3,282,576 | 11/1966 | Bruckert et al. | 261/114 R |
| 3,712,595 | 1/1973 | Hirsch | 261/114 R |
| 3,765,659 | 10/1973 | Reilly | 261/109 |
| 3,887,665 | 6/1975 | Mix et al. | 261/114 R |

Primary Examiner—William A. Cuchlinski, Jr.

[57] ABSTRACT

Vapor-liquid contacting in apparatus of the cross-flow type featuring, in various aspects, baffles extending generally in the direction of liquid flow across the tray to reduce the amplitude of small wavelength vertical liquid oscillations, increased column throughput, reduced column stage height, reduced liquid flow rate, a flow resistance at the underside of the tray to reduce pressure coupling between the underside of the tray and the main volume of vapor beneath the tray, liquid de-entrainment with an impingement type separator mounted above the tray, vapor de-entrainment with a special porous separator, an improved froth initiator, and special baffle constructions.

67 Claims, 8 Drawing Figures

VAPOR-LIQUID CONTACTING

BACKGROUND OF THE INVENTION

This invention relates to vapor-liquid contacting in apparatus of the cross-flow type, e.g., in a fractional distillation column.

Certain aspects of the invention represent improvements upon the apparatus and process claimed in prior U.S. Pat. No. 3,887,665, the disclosure of which is hereby incorporated by reference.

SUMMARY OF THE INVENTION

One limitation on the operation of vapor-liquid contacting apparatus is flooding.

The term "flooding" is used herein in its broad sense to encompass (a) the jetting of liquid from one tray up into the next, often referred to as "priming"; (b) so-called "downcomer flooding", which occurs when the liquid head is insufficient to cause liquid to exit through the downcomer, either because liquid density has been decreased by gas entrainment, or because pressure drop across the tray is too high; and (c) excessive entrainment of liquid droplets by vapor flow at the tray orifices and in the froth.

Flooding limits superficial gas velocity and hence column throughput. For a given throughput, flooding also imposes column stage height requirements. The particular type of flooding responsible for these limitations depends upon the system being processed. Thus, at low values of the group $(L/G)\sqrt{\rho_g/\rho_l}$ (where L and G are liquid and vapor flow rates, respectively, and $\rho_l$ and $\rho_g$ are liquid and vapor densities, respectively) entrainment tends to be the limiting factor, whereas at higher values of that group (e.g., at higher pressures or with higher density vapor) priming and downcomer flodding become dominant.

Liquid entrainment also limits the ability to use low liquid flow rates along the tray, since that flow rate must be kept substantially above the entrainment rate to maintain an effective liquid head on the tray. High entrainment rates also lower plate efficiency.

In one aspect the invention makes possible unusually high superficial gas velocity through a given column without flooding, substantially increasing column throughput. Alternatively, the benefit of this aspect of the invention may be taken by way of reduced column stage height. In another aspect of the invention, unusually low liquid flow rates without excessive entrainment are made possibel over a wide range of gas velocities.

Yet another limitation is liquid dumping through the tray openings, which restricts the ability to use trays with a high percentage of open area, particularly at the turndown point. Said prior U.S. Pat. No. 3,887,665 is concerned with lowering the dumping point, and the present invention in some of its aspects provides improved means for accomplishing the purpose of that patent.

In yet another aspect the invention provides an improved froth initiator, of simple and inexpensive construction, at the liquid inlet end of the tray.

In yet another aspect the invention provides improved means for de-entraining vapor from liquid passing to the stage below.

In yet another aspect the invention provides improved means for de-entraining liquid from vapor passing to the stage above.

In its increased column throughput aspect the invention features raising the flooding point by providing a multiplicity of spaced, generally vertical baffles above the tray, the baffles extending generally in the direction of liquid flow across the tray and being sufficiently close together to substantially reduce the amplitude of vertical fluid oscillations having a wavelength which is small relative to the width of said tray, and increasing the superficial vapor velocity to above the flooding-limited maximum permissible velocity associated with the column in the absence of the baffles. Alternatively, the baffling is used in conjunction with column stage height below the flooding-limited height associated with the stage in the absence of the baffles. In its low liquid flow rate aspect the invention features reducing liquid entrainment with the same baffles, and reducing the rate of liquid flow along the tray to below the entrainment-limited minimum associated with the tray in the absence of the baffles. In its lowered dumping point aspect the invention features means mounted beneath the tray to form a flow resistance sufficiently close to the underside of the tray to substantially reduce pressure coupling between the underside of the tray and the main volume of vapor beneath the tray, whereby the minimum permissible vapor velocity and the dumping point are correspondingly lowered. In its liquid de-entrainment aspect the invention features an impingement type separator mounted above the tray (and, where used in conjunction with the baffling, above the baffles), in the path of vapor passing to the stage above, the separator having its major surfaces tilted at 45°–75° to the horizontal and extending generally parallel to the direction of liquid flow along the tray. Under conditions where priming is not a factor, the separator by itself will raise the flood point to permit increased throughput, reduced stage height, or low liquid flow rate. In its vapor de-entrainment aspect the invention features a special porous separator mounted in the path of liquid flow to the tray below and arranged to preferentially retard vapor bubbles. The invention also features an improved froth initiator comprising an inlet weir sloping from the bottom of the liquid downcomer upwardly in the direction of liquid flow along the tray and extending over vapor openings in the tray through which vapor passes from the stage below, the weir and the downcomer apron being arranged relative to each other so as to cause liquid to enter the stage in a thin sheet into froth which is propelled in the direction of liquid flow by said vapor entering beneath said weir and deflected downstream thereby. The invention also features certain special baffle constructions.

In preferred embodiments the baffles are spaced apart less than 4 inches plus half the height of the outlet weir (the space most preferably being less thant 2½ inches); baffle height is at least as great as the average baffle-to-baffle spacing; the impingement type separator is a zig-zag arrangement, preferably of porous mesh, extending generally across the stage and having its vertices generally parallel to the direction of liquid flow along the tray; the porous separator for vapor de-entrainment is mounted in a liquid downcomer and consists of a screen or mesh, preferably pleated and sloping downwardly and outwardly, with special baffling provided above the separator to enhance the upward return of vapor; the means mounted beneath the tray to lower the dumping point is a perforated plate (with its holes misaligned with those of the tray and with the spacing between the tray and the plate being no less than ¼ the average diameter of the holes in the plate) spaced beneath the tray of a porous mesh (having a flow resistance not substantially less than the flow resistance of the tray) mounted in contact with the undersurface of the tray, the tray in some embodiments having an open area between 15% and 55% of its total active area; and the froth initiator weir extends to above the apron of the downcomer, has a clearance from the apron of 1/16 inch-1 inch, and has a forward tilt of 30°-60°, causing the liquid sheet to enter with forward and upward thrust.

Other advantages and features of the invention will appear from the following description of preferred embodiments thereof, includng the drawings.

DESCRIPTION OF PREFERRED EMBODIMENTS

Figure 1:
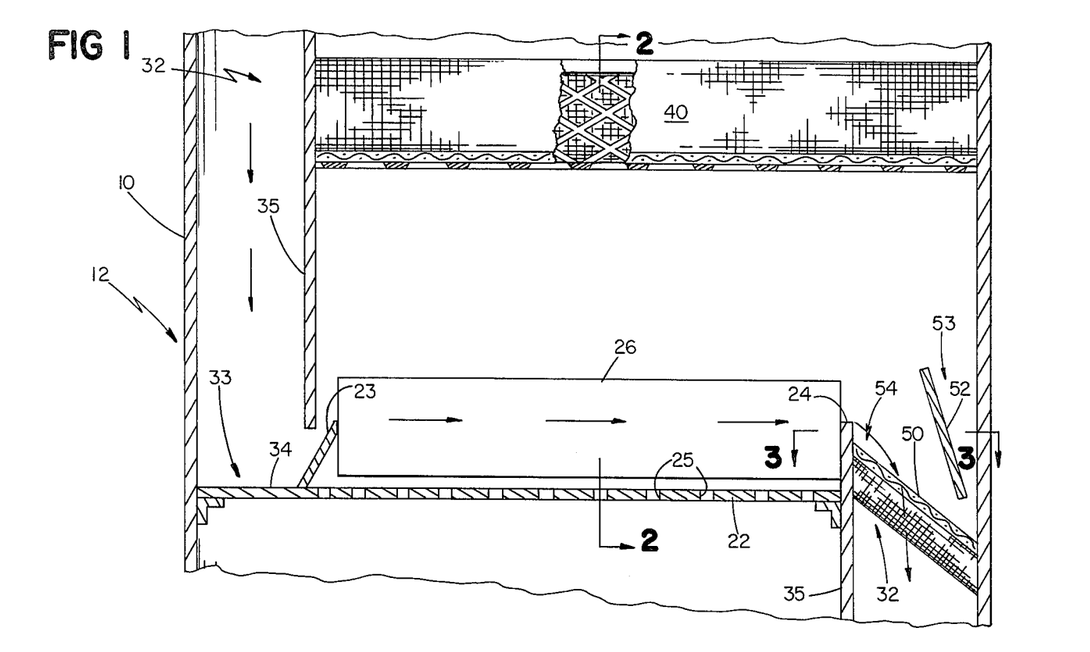
FIG. 1 is a semi-schematic, fragmentary, vertial sectional view of one stage of a fractional distillation column embodying the invention.

Referring to the drawings, cylindrical housing 10 of liquid-vapor contacting and separating column 12 has a conventional central vapor inlet and reboiler (not shown) below its bottom stage. A series of contact stages is vertically arranged inside housing 10. Considering an intermediate stage shown as typical, a plate 22 extends across housing 10. The downcomer 32 from the tray above carries liquid from the tray above into seal pan 33 with base 34. The liquid flows under downcomer apron 35 and over forward sloping inlet weir 23 (which preferably extends above apron 35) onto the active portion of tray 22 between the base of the inlet weir and vertical outlet weir 24. The clearance between the downcomer apron and the inlet weir ($\frac{1}{4}$ inch as shown, with a preferred range of 1/16 to 1 inch, the preferred clearance being smaller for lower liquid flow rates), and the forward tilt of the inlet weir (60° to the horizontal as shown with a preferred range of 30° to 75°), are such as to cause the liquid to enter the tray as a relatively thin sheet with a forward and upward thrust.

The active section of plate 22 between inlet weir 23 and outlet weir 24 is perforated with holes 25, $\frac{1}{2}$ inch in diameter on 1.2 inch square centers in the embodiment shown. The area of the holes thus amounts to 13.7% of the total area of the active section of the plate. In general, the plate free area should be chosen to be high enough so as not to give an unacceptably high plate pressure drop at design throughput, but not to be so high as to lead to excessive weeping at turndown.

The inlet region configuration acts to promote rapid aeration of the incoming liquid without weeping, since the thin liquid sheet is introduced by sloping weir 23 into a body of aerated froth which is propelled down the plate by vapor entering from beneath weir 23 and deflected downstream by its sloping undersurface. The configuration also serves to quickly carry incoming liquid away from the inlet region.

Figure 2:
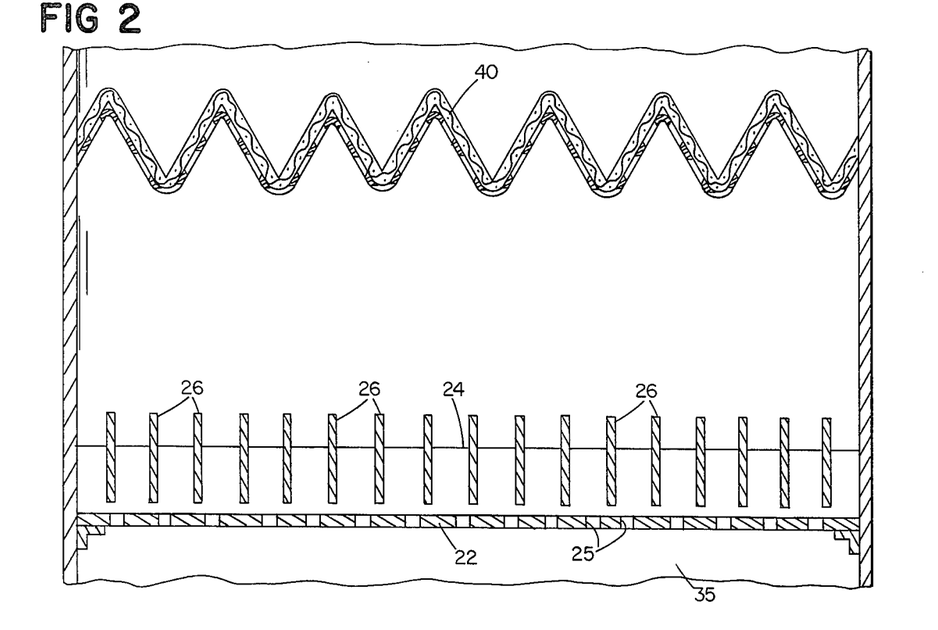
FIG. 2 is a sectional view taken along 2—2 of FIG. 1.

Spaced, generally parallel, baffles 26 are located above the plate to limit and damp fluid oscillations by subdivision of the froth. These baffles 26 run in the direction of liquid flow across the plate, are about 3 inches high, and are spaced across the plate. Advantageously, the baffles may be made of expanded metal and located directly on the plate while still permitting some transverse liquid flow to equalize minor head differences which may develop. The baffles are spaced on 1.5 inch centers at the center of the plate, and are more closely spaced at the inlet and outlet, being slightly angled or curved to match the widening of the liquid flow area at the center of the plate. The baffles prevent formation of large scale non-uniformities in the flow of liquid across the plate, and also enable a closer realization of the increase in plate efficiency over point efficiency due to the cross-flow effect by minimizing liquid eddying, backmixing, channeling, and bypassing.

The primary function of the baffles in the present invention is the reduction of amplitude of vertical fluid oscillations having a wavelength which is small relative to the width of the tray. In the article *Perforated Plate Weeping*, by Zanelli and del Bianco, The Chemical Engineering Journal, Vol. 6, pp. 181-194 (1973), the text of which is hereby incorporated by reference as background and definitional information, such short wavelength (typically 10-20 cm.) oscillations are described and contrasted with transverse oscillations having a wavelength equal to twice the plate width.

The baffles reduce entrainment and increase the flooding limit for the tray in several ways: (1) By limiting the amplitude of fluid oscillations, they increase froth density and reduce froth height, thereby increasing the superficial gas velocity and F number (defined in said prior patent) attainable before the froth impacts, and is carried up into, the tray above (priming). (2) They increase the superficial gas velocity and F number at which transition from froth to spray regime operation occurs (advantageous, since for given operating conditions, spray regime operation tends to generate considerably higher entrainment rates and lower efficiencies than froth regime operation, making the froth regime far preferably for operation). (3) Because the froth on the tray is denser, the froth density at the entrance of and within the downcomer is higher, which increases the throughput attainable before downcomer flooding occurs. (4) In both the spray and froth regimes they de-entrain liquid and drain it back to the plate, maintaining a supply of liquid in the vicinity of the plate.

Reduction of the amplitude of the vertical fluid oscillations has as one of its consequences the fact that entrained liquid droplets tend to originate farther below the next stage than otherwise, and are thus more likely to be de-entrained before reaching the next stage.

Baffle spacing should in general be less than 4 inches plus $\frac{1}{2}$ the outlet weir height for the baffles to be effective in limiting vertical oscillations. For most systems, the optimum baffle spacing will be less than $2\frac{1}{2}$ inches. Baffle height should in general be equal to or greater than the average baffle center-to-center spacing.

The preferred embodiment shown also includes, downstream of the tray and baffles, a vapor-liquid separator means of the impingement type in the form of one or more spaced layers of open cellular material 40, pleated or folded in aigzag fashion and disposed generally parallel to plate 22 across the vapor flow path, with the vertices of the zigzag folds generally parallel to the direction of liquid flow across the plate. The pleats or folds extend at an angle of approximately 60° to the horizontal, although this may vary from 45° to 75°. In the preferred embodiment shown, a single layer is used, consisting of a sheet of expanded metal with six plies of woven wire mesh on top of the expanded metal. The zigzag pattern generates a vapor flow area significantly greater than the superficial column cross-section. The reduced velocity of the vapor normal to the expanded metal and mesh surfaces (due to the zigzag pattern) makes for more effective de-entrainment and makes reentrainment less likely. The steep slope of the mesh and expanded metal sections gives a gravitational force for liquid drainage down the sides of the mesh and expanded metal of 0.87 times the force of gravity and results in efficient drainage down the sides of the separator to the base of the zigzag vees and from there back to the plate. Of great importance is the fact that the vertices of the zigzags are generally parallel to the direction of liquid flow across the plate so as not to interfere with movement down the plate of froth segments which rise up into the separator region. This orientation of the separator vertices therefore minimizes the increase in hydraulic gradient generated by the separator and minimizes the stage height requirements for the plate-separator combination. The importance of this orientation increases with increase in the depth of the vees.

The separator also contributes significantly to plate mass transfer, particularly at higher vapor rates where the liquid flow rate into the separator is large, efficiency increasing as superficial gas velocity approaches the flood point.

Instead of the zigzag mesh, the separator may consist of chevron type baffles extending parallel to the direction of liquid flow along the plate, or other equivalent structures similarly having their major surfaces extending in the liquid flow direction and being at an angle of 45°–75° to the horizontal to minimize gas phase pressure drop. Under conditions where priming is not a factor, the separator by itself will raise the flood point to permit increased throughput, reduced stage height, or low liquid flow rate.

Figure 3:
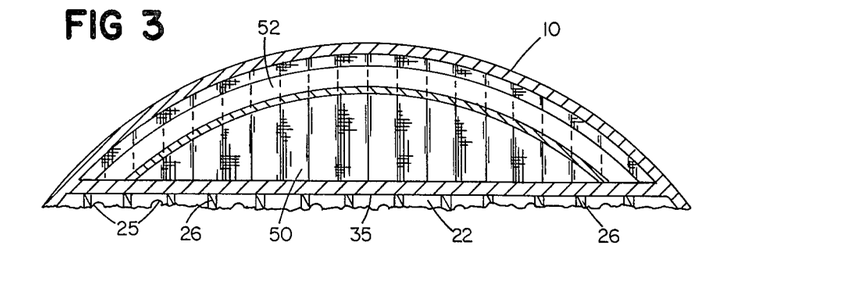
FIG. 3 is a sectional view taken along 3—3 of FIG. 1.

Liquid leaves the plate over outlet weir 24 and enters downcomer 32. In the downcomer it falls upon a downward sloping screen 50 (or a vapor coalescing mesh) which preferentially transmits liquid because the entrained vapor is held back by surface tension forces. Since the screen is wet by the liquid, a vapor bubble contacting the screens must have a force behind it exceeding $4\gamma/d$ (where $\gamma$ is the surface tension and $d$ is the average diameter of the screen openings) in order for the vapor bubble to be forced through the screen. As the vapor-liquid mixture flows down the screen, the entrained vapor bubbles will be preferentially retarded from flowing through the screen, will be directed down the screen by the flow liquid and will increase in concentration with distance down the screen. The screen is crimped into a zigzag pattern as shown in FIG. 3 to increase its surface area and thereby reduce liquid pressure drop across it and fractional blockage of it by vapor bubbles. The vapor bubbles will tend to coalesce toward the bottom of the sloping screen and rise up behind baffle 52 (which separates a vapor return zone 53 from the liquid downflow zone 54) due to hydrostatic forces generated by the lower froth density resulting from the bubble concentration and due to the larger diameter of the coalesced bubbles and rejoin the vapor rising to the plate above. This screen and baffle arrangement in the downcomer therefore de-entrains vapor and increases the density of the mixture in the downcomer which increases permissible throughputs with a fixed stage height or enables a reduction in stage height with a given throughput before downcomer flooding limits are reached. This is particularly apt to be beneficial in high pressure towers such as the light ends towers in a petroleum refinery where the vapor density is high, the difference between liquid and vapor density relatively small, the surface tension low, and the throughputs high. These conditions favor the entrainment of the vapor in the downcomer liquid as a fine-bubble, slow-rising foam, make the vapor difficult to de-entrain, and make this regime one likely to be downcomer flooding limited.

Figure 6:
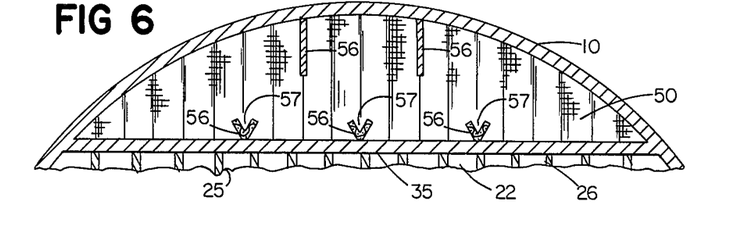
FIG. 6 is a sectional view similar to FIG. 3 showing another embodiment.

Alternatively (FIGS. 6, 8), several vertical baffles 56 are distributed through the downcomer above screen 50. Those baffles 56 near the outlet weir (where there is a substantial horizontal component of liquid flow) are preferably V-shaped with their vertices pointing toward the tray. These baffles help remove entrained vapor in two ways. First, as liquid flows horizontally past the V-shaped baffles, the V-shape separates the flow, producing a low pressure region in zone 57 behind each baffle where the vapor concentrates and rises. Second, oscillating bubbles in general tend to move toward a wall, so that even in the absence of a horizontal liquid flow, component vapor should collect along the baffle walls and rise.

As mentioned above, a vapor coalescing mesh may be used instead of screen 50. Alternatively, such mesh may be placed on top of the screen. The mesh should stimulate coalescence of vapor bubbles because of preferential wetting and drag which will distort and increase the interfacial area, increasing the likelihood of collision between vapor bubbles and coalescence.

Experimental trials of apparatus including the baffling, de-entrainment mesh, and froth initiator of the invention with an air-water atmospheric pressure system indicate that the invention raises the flooding limit to as much as 60% higher (and in almost all cases at least 30% higher) than that of conventional trays, enabling practical and efficient operation at much higher superficial gas velocities (e.g., over 15 ft./sec. in a number of trials) with correspondingly increased throughput. Alternatively to increasing throughput, the increased flooding limit may be taken advantage of by reducing stage height.

The ability of the tray to operate with unusually low liquid flow rates (e.g., an order of magnitude lower, and in almost all cases at least 50% lower) is evident also from experimental trials. In trials with an air-Isopar M (an aliphatic hydrocarbon liquid of low surface tension) system, it was shown that the tray may be operated, with a liquid rate of a little under 0.1 gpm/inch of weir length, from a superficial velocity of a little over 3 ft./sec. to one of over 10 ft./sec. without either entrainment or weeping occurring to any significant extent. By comparison, at that flow rate a conventional sieve plate has a very limited range of superficial velocities, if any, over which it may be operated without either entrainment or weeping. Other trials, with an air-water system at atmospheric pressure and a low (6%) free area tray, have demonstrated low entrainment with liquid flow rates as low as 0.03 gpm/inch of weir length.

Figure 4:
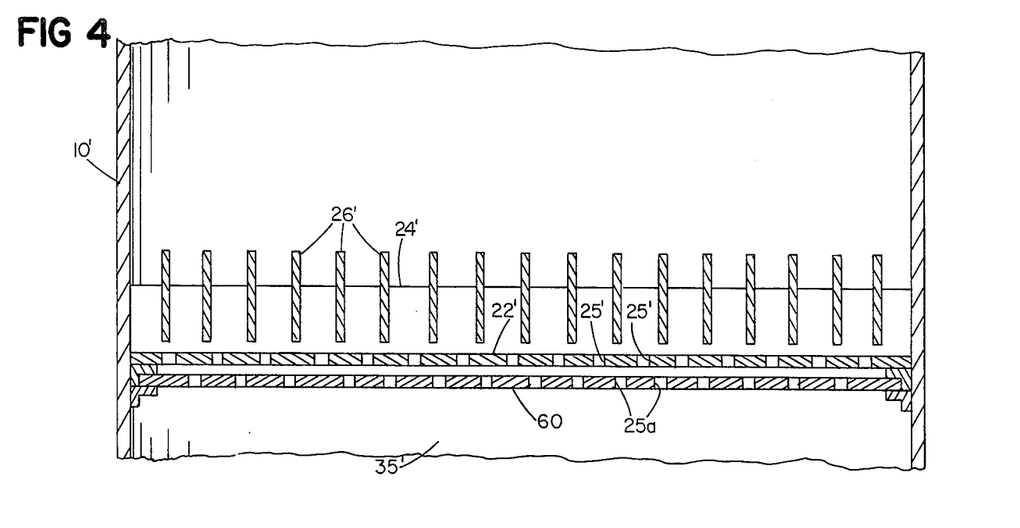
FIG. 4 is a fragmentary sectional view similar to FIG. 2 showing another embodiment of the invention.
Figure 5:
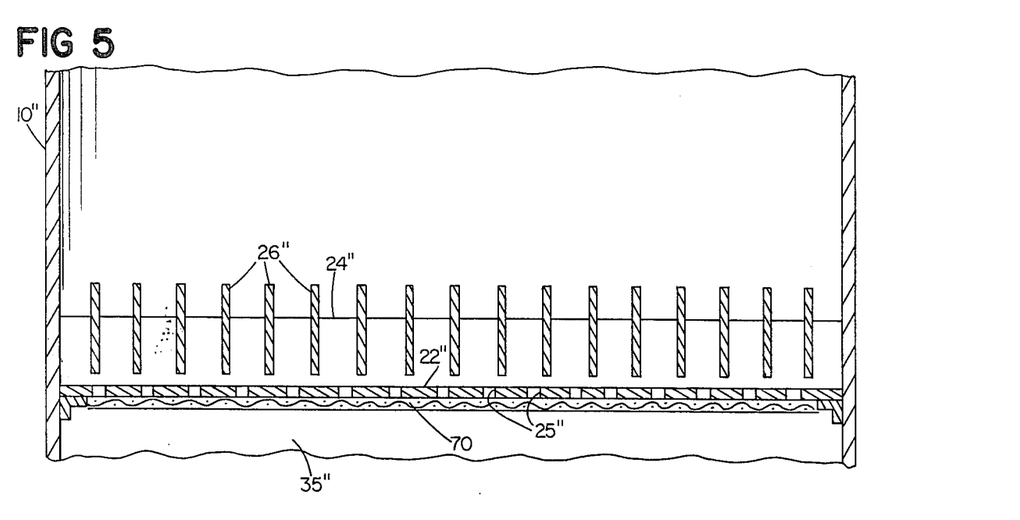
FIG. 5 is a fragmentary sectional view similar to FIG. 4, showing another embodiment of the invention.

FIGS. 4 and 5 show other embodiments in which the baffles of FIGS. 1-3 are optionally used.

Referring to FIG. 4, the active section of plate 22' between inlet weir 23 and outlet weir 24 is perforated with ½ inch diameter holes 25' on ¾ inch centers. The area of the holes amounts to 35% of the total active area of the plate. Spaced 3/16 inch below plate 22' is a similar plate 60 also perforated with ½ inch holes 25a on ¾ inch centers. The holes in the two plates are preferably misaligned so that no vertical path directly down through both sets of holes exists. The lower plate acts as a flow resistance and is sufficiently close to the underside of the main plate to substantially reduce pressure coupling between the underside of the tray and the main volume of vapor beneath the tray, whereby the minimum permissible vapor velocity and the dumping point are correspondingly lowered. The space between these plates acts as a capacitance zone which is in series with the two flow resistances formed by the holes in the two plates. The staggering of the plate holes not only blocks pressure fluctuation transmittal, but also leads to the deentrainment of droplets from the gas flow by impact on the bottom of the upper plate as the upper plate deflects the flow of gas through the holes in the lower plate. Deentrained droplets coalesce into films as they impact, and the liquid drips back to the plate from which it was entrained as the films grow.

Since, according to the invention, the flow resistance of the bottom plate is comparable to or larger than that of the top plate, the dominant flow capacitance affecting pressure fluctuations at the holes in the top plate will be based on the chamber volume between the plates. By analogy with the work of Hughes et al. ("The Formation of Bubbles at Simple Orifices", Chemical Engineering Progress, Vol. 51, p. 557 (1955)), the flow capacitance between the two plates may be represented by the dimensionless number:

$$N_C = g\rho_l - \rho_g)V_c/A_o\rho_g c^2 = g(\Delta\rho)V_c/A_o\gamma P,$$

where $g$ = acceleration due to gravity
$\Delta\rho = \rho_l - \rho_g$ = the difference between the liquid and gas densitities
$V_c$ = the active chamber volume between the plates
$A_o$ = the total open area of the top plate
$\rho_g$ = the gas density
$c$ = the velocity of sound in the gas
$\gamma$ = the ratio of the specific heat at constant pressure to that at constant volume for the gas
$P$ = the pressure in the gas Smaller values of this number lead to more rapid fluctuations of more limited amplitude while larger values lead to slower fluctuations of larger amplitude. Therefore, the amplitude of pressure fluctuations beneath the top plate may be kept small and the frequency of these fluctuations high by maintaining the spacing between the plates small. Since weeping is less likely if the pressure deviations below the mean are small and of limited duration, the flow capacitance zone can significantly lower the tendency of a bubble plate to weep. From the dimensionless capacitance number, it is apparent that as pressure is reduced, chamber volume must also be reduced if the capacitance number is to be kept below a given value. The double plate configuration which makes the chamber volume small is therefore most apt to be required (to enable operation with low hole F numbers without weeping) in low pressure operation where low pressure drop is apt to be of critical importance and where low hole velocities are necessary to avoid spray regime operation and high entrainment which would otherwise be produced by low heads and high gas velocities for a given F number. In general, the spacing between the plates should be no less than (and not much greater than) ¼ the average diameter of the perforations in the lower plate, so that the flow resistance between the plates will be no greater than the flow resistance of the lower plate. In effect, the double plate introduces an impedance mismatch between the volume beneath the plates and that contained between the plates and prevents the transmittal of lower frequency, larger scale pressure fluctuations into and through the space between the plates.

The effectivenes of this double plate configuration in reducing the hole velocity at which weeping commences has also been established by trials with an atmospheric pressure air-water system. For example, with a liquid rate of about 1.5 gpm/inch of outlet weir, the hole velocity at which weeping commences in the double plate configuration with ¼ inch perforations is about 16 ft./sec., while with a comparable conventional sieve tray weeping would typically occur with hole velocities below about 32 ft./sec.

Results similar to those obtained with the double plate configuration may be obtained by placing a suitable porous matrix material beneath plate 22" instead of a second plate. Referring to FIG. 5, the porous material 70 (e.g., eight layers of stainless steel mesh totalling ¼ inches thick) is in contact with the underside of plate 22" and has a flow resistance not substantially less than that of the plate itself in a sufficiently limited depth so that the flow capacitance of the porous material is sufficiently small. This material will reduce the amplitude of pressure fluctuations under the plate and increase their frequency in a manner similar to that of the double plate configuration.

The embodiments of FIGS. 4 and 5 represent alternative, and greatly improved, ways of achieving the high free tray area (e.g., 15%-55%), low pressure drop, and low dump point advantages of the structures claimed in said prior U.S. Pat. No. 3,887,665 without the disadvantages of, e.g., the hydraulic gradient in the liquid on the plate which inherently results from the porous matrix located as disclosed in that patent.

The froth initiator of FIGS. 1 and 2 is particularly useful in low pressure drop, high free tray area systems such as those of FIGS. 4 and 5, particularly when operated near the turndown point, since it prevents the buildup of excessive unaerated liquid head at the inlet region.

Although the invention has been illustrated in FIGS. 1-5 in connection with a perforated plate tray, it is also applicable to other types of orificed trays, such as, e.g., valves.

Figure 7:
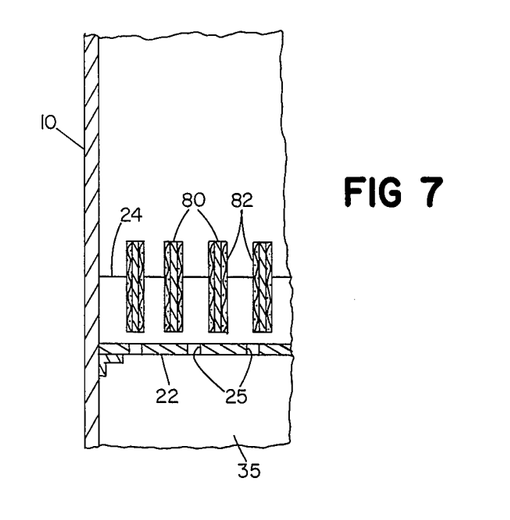
FIG. 7 is a fragment of a sectional view similar to FIGS. 2 and 5 showing another embodiment; and, FIG. 8 is a fragment of a view similar to FIG. 1 showing another embodiment.
Figure 8:
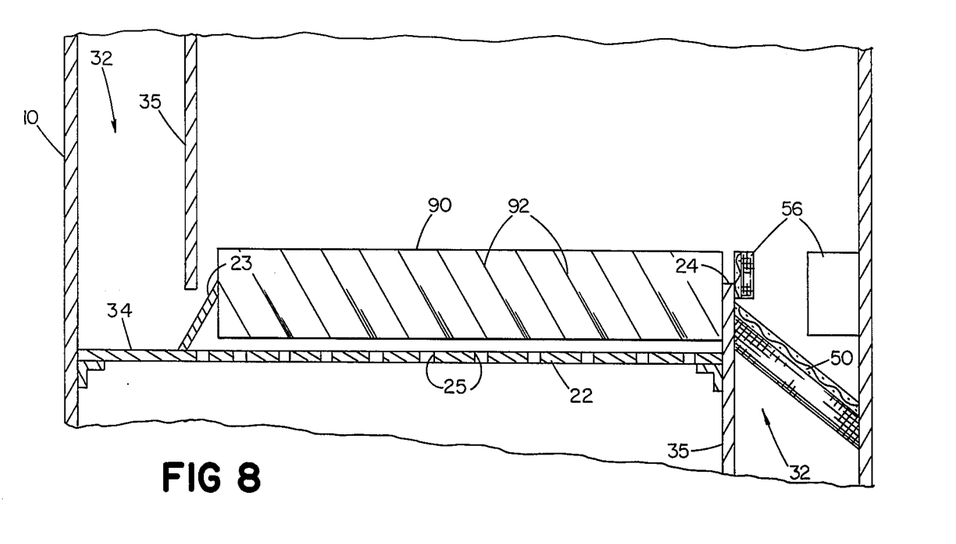

FIGS. 7 and 8 show special forms of baffles for use as baffles 26, 26', and 26" of FIGS. 2, 4 and 5. Referring to FIG. 7, a ¼ inch layer of mesh (wettable by the liquid of the system being processed) 80 is placed in contact with each side of each baffle 82. The mesh increases the thickness of the layer of vapor-free liquid adjacent the baffles and thereby induces a greater return flow of liquid to the plate at the baffles, increasing froth density, improving vapor-liquid disengagement, and reducing froth height, thereby increasing the maximum permissible vapor and liquid flows before flooding conditions are reached. To counteract any excessive hydraulic gradient introduced by the mesh, directional plate orifices or other conventional means may be used.

Referring to FIG. 8, baffles 90 have corrugations 92 sloping downward and in the direction of liquid flow across the plate. These corrugations provide flow channels which will tend to return vapor-free liquid to the plate.

Alternatively, the mesh of FIG. 7 can be crimped and oriented to preferentially drain liquid downward and in the direction of liquid flow.

Other embodiments are within the following claims.

What is claimed is:

1. In a vapor-liquid contacting process comprising supplying vapor through an orificed tray in a contacting and separating stage of the cross-flow type having vapor and liquid inlets thereto, wherein said tray is mounted in effective communication with both said inlets to permit vapor to rise through said tray to contact said liquid thereabove and produce a two phase dispersion of vapor and liquid supported on said tray, and wherein the maximum permissible throughput of vapor through said stage is limited by a flooding point associated with said stage, that improvement comprising raising said flooding point by providing a multiplicity of spaced, generally vertical baffles above said tray, said baffles extending generally in the direction of liquid flow across said tray and being sufficiently close together to substantially reduce the amplitude of vertical oscillations in said dispersion having a wavelength which is small relative to the width of said tray, said tray being orificed between each pair of said baffles, and increasing the superficial vapor velocity through said stage to a value corresponding to vapor throughput exceeding said maximum permissible throughput associated with said stage in the absence of said baffles.

2. The improvement of claim 1 wherein said baffles are of expanded metal and are located directly on said tray.

3. The improvement of claim 1 wherein said baffles have layers of mesh in contact with their major surfaces.

4. The improvement of claim 1 wherein said baffles are corrugated to provide liquid flow channels sloping downwardly and in the direction of liquid flow across the tray.

5. The improvement of claim 1 wherein said stage has an outlet weir and said baffles are spaced apart by less than 4 inches plus half the height of said weir.

6. The improvement of claim 1 wherein said baffles are spaced apart by less than 2 ½ inches.

7. The improvement of claim 1 wherein the height of said baffles is at least as great as the average baffle-to-baffle spacing.

8. The improvement of claim 1 wherein said superficial vapor velocity is increased to a value corresponding to vapor throughput exceeding by at least 30% said maximum permissible throughput associated with said stage in the absence of said baffles.

9. The improvement of claim 1 further comprising the de-entrainment of liquid from vapor passing to the stage above, by mounting an impingement type separator above said baffles in the path of said vapor.

10. The improvement of claim 9 wherein said separator has its major surfaces tilted at 45°–75° to the horizontal and extending generally parallel to the direction of liquid flow along said tray.

11. The improvement of claim 10 wherein said separator comprises a zigzag arrangement of porous material extending generally across said stage and having its vertices generally parallel to the direction of liquid flow along said tray.

12. The improvement of claim 1 further comprising de-entrainment of vapor from liquid passing to the stage below, by use of a porous separator mounted in the path of liquid flow to the tray below and arranged to preferentially retard vapor bubbles.

13. The improvement of claim 12 further comprising de-entraining said vapor by mounting said separator in a liquid downcomer, said separator comprising a porous medium sloping downwardly toward the outer wall of said stage.

14. The improvement of claim 13 further comprising a sloping baffle in said downcomer above said medium to define separate vapor return and liquid downflow zones.

15. In a vapor-liquid contacting apparatus of the cross-flow type having a column housing and at least one contact stage in said housing, said apparatus including liquid and vapor inlets to said stage and an orificed tray mounted in effective communication with both said inlets to permit vapor to rise through said tray to contact said liquid thereabove and produce a two phase dispersion of vapor and liquid supported on said tray, and wherein the minimum permissible effective height of said stage is limited by a flooding point associated with said stage, that improvement wherein a multiplicity of spaced, generally vertical baffles are arranged above said tray, said baffles extending generally in the direction of liquid flow across said tray and being sufficiently close together to raise said flooding point by substantially reducing the amplitude of vertical oscillations in said dispersion having a wavelength which is small relative to the width of said tray, and the effective height of said stage is less than said minimum permissible height associated with said stage in the absence of said baffles wherein said baffles are corrugated to provide liquid flow channels sloping downwardly and in the direction of liquid flow across the tray.

16. The improvement of claim 15 wherein said baffles are of expanded metal and are located directly on said tray.

17. The improvement of claim 15 wherein said baffles have layers of mesh in contact with their major surfaces.

18. The improvement of claim 15 wherein said stage has an outlet weir and said baffles are spaced apart by less than 4 inches plus half the height of said weir.

19. The improvement of claim 15 wherein said baffles are spaced apart by less than 2 ½ inches.

20. The improvement of claim 15 wherein the height of said baffles is at least as great as the average baffle-to-baffle spacing.

21. In a vapor-liquid contacting process comprising supplying vapor through an orificed tray in a contacting and separating stage of the cross-flow type having vapor and liquid inlets thereto, wherein said tray is mounted in effective communication with both said inlets to permit vapor to rise through said tray to contact liquid thereabove and produce a two phase dispersion of vapor and liquid supported on said tray, and wherein the liquid flow rate along said tray has an effective lower limit related to the rate of liquid entrainment associated with vapor flow through said stage, that improvement comprising reducing said lower limit by providing a multiplicity of spaced, generally vertical baffles above said tray, said baffles extending generally in the direction of liquid flow across said tray and being sufficiently close together to substantially reduce the amplitude of vertical oscillations in said dispersion having a wavelength which is small relative to the width of said tray, and reducing the rate of liquid flow along said tray to below said limit associated with said stage in the absence of said baffles.

22. The improvement of claim 21 wherein said baffles are of expanded metal and are located directly on said tray.

23. The improvement of claim 21 wherein said baffles have layers of mesh in contact with their major surfaces.

24. The improvement of claim 21 wherein said baffles are corrugated to provide liquid flow channels sloping downwardly and in the direction of liquid flow across the tray.

25. The improvement of claim 21 wherein said stage has an outlet weir and said baffles are spaced apart by less than 4 inches plus half the height of said weir.

26. The improvement of claim 21 wherein said baffles are spaced apart by less than 2 ½ inches.

27. The improvement of claim 21 wherein the height of said baffles is at least as great as the average baffle-to-baffle spacing.

28. The improvement of claim 21 wherein said rate of liquid flow is reduced to less than half of said limit associated with said stage in the absence of said baffles.

29. The improvement of claim 21 further comprising the de-entrainment of liquid from vapor passing to the stage above, by mounting an impingement type separator above said baffles in the path of said vapor.

30. The improvement of claim 29 wherein said separator has its major surfaces tilted at 45°–75° to the horizontal and extending generally parallel to the direction of liquid flow along said tray.

31. The improvement of claim 30 wherein said separator comprises a zigzag arrangement of porous material extending generally across said stage and having its vertices generally parallel to the direction of liquid flow along said tray.

32. The improvement of claim 21 further comprising de-entrainment of vapor from liquid passing to the stage below, by use of a porous separator mounted in the path of liquid flow to the tray below and arranged to preferentially retard vapor bubbles.

33. The improvement of claim 32 further comprising de-entraining said vapor by mounting said separator in a liquid downcomer, said separator comprising a porous medium sloping downwardly toward the outer wall of said stage.

34. The improvement of claim 33 further comprising a sloping baffle in said downcomer above said medium to define separate vapor return and liquid downflow zones.

35. In a vapor-liquid contacting apparatus of the cross-flow type having a column housing and at least one contact stage in said housing, said apparatus including liquid and vapor inlets to said stage and an orificed tray mounted in effective communication with both said inlets to permit vapor to rise through said tray to contact said liquid thereabove and produce a two phase dispersion of vapor and liquid supported on said tray, and wherein the minimum permissible vapor velocity through said tray is limited by a dumping point associated with said stage, that improvement comprising a multiplicity of spaced, generally vertical baffles above said tray, said baffles extending generally in the direction of liquid flow across said tray and being sufficiently close together to substantially reduce the amplitude of vertical oscillations in said dispersion having a wavelength which is small relative to the width of said tray, and means mounted beneath said tray to form a flow resistance that is substantially uniform across the entire orificed area of said tray and is sufficiently close to the underside of said tray and the main volume of vapor beneath said tray, whereby said minimum permissible vapor velocity and said dumping point are correspondingly lowered.

36. The improvement of claim 35 wherein said means is a perforated plate spaced beneath said tray.

37. The improvement of claim 36 wherein said tray is a plate having perforations misaligned with those of said means.

38. The improvement of claim 36 wherein the spacing between said tray and said perforated plate is no less than ¼ the average diameter of the perforations in said plate.

39. The improvement of claim 35 wherein said means is porous mesh mounted in contact with the undersurface of said tray.

40. The improvement of claim 39 wherein said mesh has a flow resistance not substantially less than the flow resistance of said tray.

41. The improvement of claim 35 wherein said tray has open area between 15% and 55% of its total active area.

42. The improvement of claim 35 wherein said baffles are of expanded metal and are located directly on said tray.

43. The improvement of claim 35 have layers of mesh in contact with their major surfaces.

44. The improvement of claim 35 wherein said baffles are corrugated to provide liquid flow channels sloping downwardly and in the direction of liquid flow across the tray.

45. In a vapor-liquid contacting apparatus of the cross-flow type having a column housing and at least one contact stage in said housing, said apparatus including liquid and vapor inlets to said stage and an orificed tray mounted in effective communication with both said inlets to permit vapor to rise through said tray to contact said liquid thereabove and produce a two phase dispersion of vapor and liquid supported on said tray, that improvement comprising an impingement type separator mounted about said tray in the path of vapor passing to the stage above, said separator having its major surfaces tilted at 45°–75° to the horizontal and extending generally parallel to the direction of liquid flow along the tray.

46. The improvement of claim 45 wherein said separator comprises a zigzag arrangement of porous material extending generally across said stage and having its vertices generally parallel to the direction of liquid flow along said tray.

47. The improvement of claim 46 wherein the major surfaces of said porous material extend at approximately 60° to the horizontal.

48. The improvement of claim 46 wherein said porous material comprises a plurality of plies of woven wire mesh mounted on a support structure.

49. The improvement of claim 48 wherein said support structure is expanded metal.

50. In a vapor-liquid apparatus of the cross-flow type having a column housing and at least one contact stage in said housing, said apparatus including a vapor inlet and a liquid downcomer to said stage and an orificed tray mounted in effective communication with said vapor inlet and said downcomer to permit vapor to rise through said tray to contact said liquid thereabove and produce a two phase dispersion of vapor and liquid supported on said tray, that improvement comprising
a porous medium mounted in said downcomer to de-entrain vapor from liquid passing therethrough.

51. The improvement of claim 50 wherein said medium slopes downwardly toward the outer wall of said stage.

52. The improvement of claim 51 wherein said medium is pleated with is vertices parallel to the direction of said slope.

53. The improvement of claim 50 further comprising a sloping baffle in said downcomer above said medium to define separate vapor return and liquid downflow zones.

54. The improvement of claim 50 further comprising a plurality of vertical baffles distributed through said downcomer above said medium to provide wall surfaces along which vapor can collect and rise.

55. The improvement of claim 54 wherein said baffles include V-shaped baffles located adjacent the liquid outlet side of said tray with their vertices pointing toward said tray to produce separation of liquid flow and resulting low pressure regions behind said V-shaped baffles for vapor concentration.

56. The improvement of claim 50 wherein said medium is a vapor coalescing mesh.

57. The improvement of claim 56 wherein said mesh is on top of a screen.

58. In a vapor-liquid contacting apparatus of the cross-flow type having a column housing and at least one contact stage in said housing, said apparatus including liquid and vapor inlets to said stage and an orificed tray mounted in effective communication with both said inlets to permit vapor to rise through said tray to contact said liquid thereabove and produce a two phase dispersion of vapor and liquid supported on said tray, that improvement comprising a multiplicity of spaced, generally vertical baffles extending generally in the direction of liquid flow across said tray and being sufficiently close together to substantially reduce the amplitude of vertical oscillations in said dispersion having a wavelength which is small relative to the width of said tray, said baffles being corrugated to provide liquid flow channels sloping downwardly and in the direction of liquid flow across the tray.

59. In a vapor-liquid contacting process comprising supplying vapor through an orificed tray in a contacting and separating stage of the cross-flow type having vapor and liquid inlets thereto, wherein said tray is mounted in effective communication with both said inlets to permit vapor to rise through said tray to contact said liquid thereabove and produce a two phase dispersion of vapor and liquid supported on said tray, and wherein the maximum permissible throughput of vapor through said stage is limited by a flooding point associated with said stage, that improvement comprising
raising said flooding point by providing an impingement type separator mounted above said tray in the path of vapor passing to the stage above, said separator having its major surfaces tilted at 45°–75° to the horizontal and extending generally parallel to the direction of liquid flow along the tray, and
increasing the superficial vapor velocity through said stage to a value corresponding to vapor throughput exceeding said maximum permissible throughput associated with said stage in the absence of said separator.

60. The improvement of claim 59 wherein said separator comprises a zigzag arrangement of porous material extending generally across said stage and having its vertices generally parallel to the direction of liquid flow along said tray.

61. The improvement of claim 60 wherein the major surfaces of said porous material extend at approximately 60° to the horizontal.

62. In a vapor-liquid contacting apparatus of the cross-flow type having a column housing and at least one contact stage in said housing; said apparatus including liquid and vapor inlets to said stage and an orificed tray mounted in effective communication with both said inlets to permit vapor to rise through said tray to contact said liquid thereabove and produce a two phase dispersion of vapor and liquid supported on said tray, and wherein the minimum permissible effective height of said stage is limited by a flooding point associated with said stage, that improvement wherein
an impingement type separator is mounted above said tray in the path of vapor passing to the stage above, said separator having its major surfaces tilted at 45°–75° to the horizontal and extending generally parallel to the direction of liquid flow along the tray, and
the effective height of said stage is less than said minimum permissible height associated with said stage in the absence of said separator.

63. The improvement of claim 62 wherein said separator comprises a zigzag arrangement of porous material extending generally across said stage and having its vertices generally parallel to the direction of liquid flow along said tray.

64. The improvement of claim 63 wherein the major surfaces of said porous material extend at approximately 60° to the horizontal.

65. In a vapor-liquid contacting process comprising supplying vapor through an orificed tray in a contacting and separating stage of the cross-flow type having vapor and liquid inlets thereto, wherein said tray is mounted in effective communication with both said inlets to permit vapor to rise through said tray to contact liquid thereabove and produce a two phase dispersion of vapor and liquid supported on said tray, and wherein the liquid flow rate along said tray has an effective lower limit related to the rate of liquid entrainment associated with vapor flow through said stage, that improvement comprising
reducing said lower limit by providing an impingement type separator mounted above said tray in the path of vapor passing to the stage above, said separator having its major surfaces tilted at 45°–75° to the horizontal and extending generally parallel to the direction of liquid flow along the tray, and reducing the rate of liquid flow along said tray to below said limit associated with said stage in the absence of said separator.

66. The improvement of claim 65 wherein said separator comprises a zigzag arrangement of porous material extending generally across said stage and having its vertices generally parallel to the direction of liquid flow along said tray.

67. The improvement of claim 66 wherein the major surfaces of said porous material extend at approximately 60° to the horizontal.

* * * * *